United States Patent [19]
Christie et al.

[11] Patent Number: 5,819,230
[45] Date of Patent: *Oct. 6, 1998

[54] SYSTEM AND METHOD FOR TRACKING AND FUNDING ASSET PURCHASE AND INSURANCE POLICY

[75] Inventors: Robert A. Christie, Sausalito; C. Earl Corkett, Half Moon Bay, both of Calif.

[73] Assignee: HomeVest Financial Group, Inc., Sausalito, Calif.

[*] Notice: This patent issued on a continued prosecution application filed under 37 CFR 1.53(d), and is subject to the twenty year patent term provisions of 35 U.S.C. 154(a)(2).

[21] Appl. No.: 512,059

[22] Filed: Aug. 8, 1995

[51] Int. Cl.$^6$ .................................................. G06F 17/60
[52] U.S. Cl. .................................. 705/4; 705/38; 705/39
[58] Field of Search ................................. 395/204, 238; 705/4, 38, 39

[56] References Cited

U.S. PATENT DOCUMENTS

| | | |
|---|---|---|
| 4,642,768 | 2/1987 | Roberts . |
| 4,722,055 | 1/1988 | Roberts . |
| 4,752,877 | 6/1988 | Roberts et al. . |
| 4,839,804 | 6/1989 | Roberts et al. . |

OTHER PUBLICATIONS

James A. Ballew, "The Post–TAMRA88 Market for Single Premium Whole Life", Life & Health Insurance Sales, v 135, n 3, pp. 29–32, Mar. 1992.

Williams, Nia; "Behind on Processing"; Banking Technology; pp. 50–53, Jan. 1991.

"UK:Digital Equipment starts Multi Transact Services EDI Services—But being profitable may be hard"; Computing; p. 22, Jun. 20, 1991.

Wolman, Clive; "Well Endowed: Don't Believe it"; Financial Times, p. VIII, Jun. 29, 1985.

"AssetPlus$^{SM}$—The Money–Back Home Loan Plan", by Chuck Conrad, The Journal, Summer 1994.

Ernst & Young Financial Planning Reporter, Sep./Oct. 1994, vol. 7, Issue 5, pp. 1–8.

"Home Buyers Could Lose with Aims", Meredith Barkley, Business Weekly, p. 5.

"Risks and Rewards of New Mortgage Plans", Susan Warren, Texas Journal, Jul. 5, 1995.

"How would the AssetPlus$^{SM}$ Money–Back Home Loan™ Plan work for me?" AssetPlus$^{SM}$.

*Primary Examiner*—Gail O. Hayes
*Assistant Examiner*—William N. Hughet
*Attorney, Agent, or Firm*—Gary S. Williams; Flehr Hohbach Test Albritton & Herbert LLP

[57] ABSTRACT

A computer and communications system facilitates the administration of a mortgage and life insurance combination program in which all or a portion of the funds normally used as a down payment are used to purchase a life insurance policy. The system includes computer subsystems of a program coordinator, mortgage originators, life insurance companies, depository companies and at least one mortgage insurance company. Preferably, the system also includes the computer subsystem of licensed insurance agents. Each of the computer subsystems includes communication apparatus and software for sending communications to and receiving communications from other ones of the computer subsystems. The program coordinator maintains a database of information concerning all program participants and the products they have purchased or for which they are applying. The mortgage originator selects mortgage applicants financially eligible to participate in the combined program, determines which ones are interested in potentially participating in the combined program, and refers those applicants to the program coordinator. Each life insurance company participating in the program has facilities for establishing 7-pay life insurance policies, and for establishing associated premium deposit accounts for holding the 2nd, 3rd and 4th annual life insurance premiums associated with 7-pay life insurance policies. Each depository company has facilities for establishing mortgage collateral accounts to hold the 5th, 6th and 7th annual life insurance premiums associated with 7-pay life insurance policies. Scheduling software schedules events associated with the mortgage and life insurance application and closing process as well as funds flows and other events subsequent to the closing.

9 Claims, 11 Drawing Sheets

SYSTEM AND METHOD FOR TRACKING AND FUNDING ASSET PURCHASE AND INSURANCE POLICY

The present invention relates generally to financial transaction management systems for implementing and ministering the money flows associated with purchasing a home using a mortgage type loan and purchasing private mortgage insurance and life insurance products that protect the original mortgage lender, any subsequent purchaser of the loan, and the home buyer.

BACKGROUND OF THE INVENTION

The present invention concerns a set of data processing systems and financial accounts that support a multifaceted financial program, or set of products, that are designed to improve the financial return on the homebuyer's investment in a home and provide other "estate plan" elements.

In a typical home purchase transaction with a well qualified home buyer, the home buyer pays at least 20% of the purchase price in cash to the seller of the home and borrows the remainder from a lender. When at least 20% of the purchase price is covered by a down payment from the home buyer, the associated "loan to value" (LTV) ratio is 80% or less. When LTV associated with a home purchase mortgage is 80% or less, the lender will usually not require that the home buyer purchase private mortgage insurance (PMI) to protect the lender. As a result, such transactions are quite simple in terms of their basic financial structure.

There are other "mortgage/insurance combination programs" that use complex financial arrangements. In one such combination program, sold under trademarks such as Asset-Plus (a trademark of Securitas Financial Services), the normal mortgage is replaced with a loan that is an interest-only loan for the first ten years and fully amortizing for the last 20 years of a 30-year loan term. During the first ten years, monthly payments are applied in part to the interest on the loan, and in part to the purchase of a life insurance policy whose cash value grows over the life of the loan. A portion of the cash value of the policy at the end of the loan term can be borrowed by the homebuyer and is not a taxable distribution to the homebuyer so long as the policy is not allowed to lapse.

The NestEgg mortgage (a trademark of AmeriPlace, Inc.) program differs from the AssetPlus program in that the mortgage loan is non-amortizing for the full life of the loan. At the end of the mortgage loan term, cash from the life insurance policy is used to pay off the loan balance. A portion of the remaining cash value is reserved to pay future life insurance premiums on the policy, and the remainder of the cash value in the policy is available for use by the home buyer. Cash drawn from the life insurance policy is treated as a loan and is not taxable income to the home buyer so long as the life insurance policy is not allowed to lapse.

In both the AssetPlus and NestEgg programs, the homebuyer's "beginning cash" is used as a typical down payment that reduces the amount of money borrowed by the homebuyer, and thus directly reduces the LTV ratio, as is the case with a standard home mortgage.

In a second type of combination program, sold under trademarks such as Asset-Integrated-Mortgage (AIM) (a trademark of Financial Integration, Inc.), a portion of the traditional down payment is used to purchase an insurance company annuity policy, with another portion of the down payment being paid to the home seller. A larger than standard loan is required because less of the down payment is applied to the home purchase. The full amount of the monthly mortgage payments are applied to payment of interest and principal on the mortgage. The annuity contract's cash value grows over the life of the loan. Growth value (cash) drawn by the home buyer from the annuity contract is taxable income to the homebuyer (last in, first out). Subsequent withdrawals that recapture the initial investment are not treated as taxable income to the home buyer.

In a third combination program, sold under trademarks such as Mortgage100 (a trademark of Merrill Lynch), the homebuyer initially must place marketable securities having a total value of at least 39% of the purchase price of the home being purchased in an account that is pledged as collateral on a mortgage loan for 100% of the purchase price. The loan is a fully amortizing 15- or 30-year fixed or adjustable-rate loan, and thus is paid off by the homebuyer's monthly loan payments. If the securities in the account fall below 33% of the loan balance, the homebuyer must put more securities in the account to get back to the 33% level. Appreciation of the securities over the life of the loan helps compensate for risk associated with any depreciation of the home's value.

The above described "combination programs," all combine a home mortgage loan with another financial product or plan. All are for "well qualified" home buyers who can afford monthly mortgage payments in excess of the payments on a standard mortgage. The present invention involves a computer and communications system for managing a different mortgage/insurance combination program that provides improved homebuyer liquidity (i.e., access to cash from invested funds) and tax benefits than the aforementioned prior art programs. The mortgage/insurance program supported by the present invention requires close coordination between numerous parties (mortgage originator, life insurance company and its agents, private mortgage insurance company and the program coordinator) and the homebuyer. The present invention provides support services, including information storage and dissemination, document generation and activity coordination so as to minimize the administration burdens on the mortgage originator and homebuyer.

It is a primary goal of the present invention to provide a computer and communications system for managing a mortgage and life insurance combination program in which all or a portion of the funds normally used as a down payment, typically equal to at least 20% (twenty percent) of the home purchase price, are used to purchase a 7-payment life insurance policy.

It is another goal of the present invention to provide a computer and communications system that supports the use of a life insurance policy in a mortgage and life insurance combination program where the life insurance policy is purchased in advance of the mortgage loan closing and is funded in such a way as to qualify for favorable tax treatment (first in, first out).

It is yet another goal of the present invention to provide a computer and communications system that automatically tracks a sequence of transactions over a period of many years, where the transactions involve pre-planned movements of funds and assignments of collateral in association with a mortgage/insurance combination program or plan, as well as optional transactions initiated by homeowners.

It is yet another goal of the present invention to provide a computer system that manages a mortgage and life insurance combination program in which a certain amount of beginning cash funds are allocated to purchasing life insurance, and the size of any selected life insurance policy is determined by the computer system based on the amount of funds allocated to purchasing that life insurance product.

SUMMARY OF THE INVENTION

In summary, the present invention is a computer and communications system that manages a mortgage and life insurance combination program in which all or a portion of the funds normally used as a down payment are used to purchase a life insurance policy. The principal components of the system are the computer subsystems of a program coordinator, mortgage originators, life insurance companies, depository companies, and at least one mortgage insurance company. Preferably, the system also includes the computer subsystem of licensed insurance agents.

Each of the aforementioned computer subsystems includes communication apparatus and software for sending communications to and receiving communications from other ones of the computer subsystems. Most communications and notices associated with administering the combined mortgage and life insurance program are routed through the program coordinator so that the program coordinator can maintain a central database of information concerning all program participants and the products they have purchased or for which they are applying. More specifically, the database in the program coordinator's computer subsystem stores information about program participants, mortgage originators participating in said combined program, life insurance companies participating in said combined program and the life insurance products of the participating life insurance companies available to the program participants through the combined program, depository companies participating in said combined program, insurance agents participating in the combined program, and other entities participating directly or indirectly in the combined program.

The mortgage originator selects mortgage applicants financially eligible to participate in the combined program, determines which ones are interested in potentially participating in the combined program, and refers those applicants to the program coordinator. Up until the closing of the mortgage loan, the mortgage originator retains the ability to process the mortgage application as either a conventional mortgage loan application or as an application under the program coordinators combined program.

Each life insurance company participating in the program has facilities for establishing 7-pay life insurance policies, and for establishing associated premium deposit accounts for holding the 2nd, 3rd and 4th annual life insurance premiums associated with 7-pay life insurance policies. In the combined program, to preserve program benefits, four of the seven premium payments cannot be hypothecated in any manner during an initial seven-year tax qualifying period.

Each depository company has facilities for establishing mortgage collateral accounts for program participants. Each mortgage collateral account is used to hold the 5th, 6th and 7th annual life insurance premiums associated with a 7-pay life insurance policy. The funds in the mortgage collateral accounts are invested in certificates of deposit which mature just in time to make the associate life insurance premium payments. These funds are also pledged as collateral to the mortgage noteholder so as to reduce the amount of mortgage insurance required by the homeowner and to protect the mortgage lender against deflation of the purchased home's value.

The computer systems of the program coordinator, life insurance company and depository company include scheduling software for scheduling events associated with the mortgage and life insurance application and closing process as well as for scheduling funds flows and other events subsequent to the purchase of the life insurance policy and closing of the mortgage loan.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
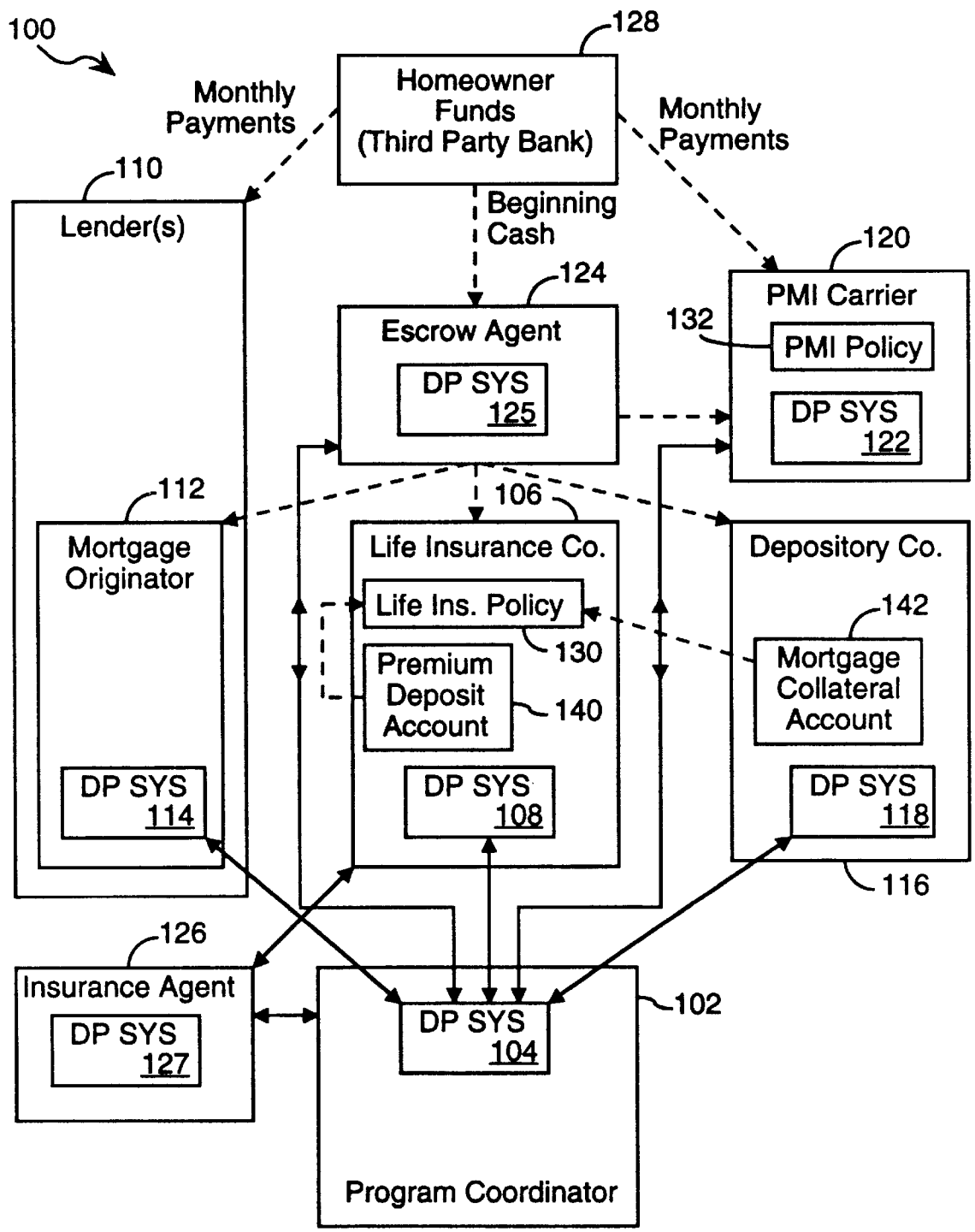
FIG. 1 is a block diagram of a set of entities, and their respective data processing systems, which work together in the management of a combined mortgage and life insurance purchase program.

Referring to FIG. 1, there is shown a system 100 that includes a set of entities, and their respective computer systems, which work together in the management of a combined mortgage and life insurance purchase program. The "DP SYS" boxes in this Figure represent the data processing systems used by the various entities to exchange information with each other and to retain information needed for management of the combined mortgage and life insurance purchase program.

The primary participants or entities involved in the system 100 are:

a program coordinator 102 and its computer system 104;

one or more life insurance companies 106 and their respective computer systems 108;

mortgage lenders 110, including mortgage originators 112 and their respective computer systems 114;

depository companies 116 and their respective computer systems 118;

mortgage insurance companies (PMI carriers) 120 and their respective computer systems 122;

escrow agents 124 and their respective computer systems 125; and insurance agents 126 and their respective computer systems 127.

An indirect participant is the bank or other institution 128 which holds a homebuyer's funds prior to participation in the combined mortgage and life insurance purchase program.

Information flows are represented in FIG. 1 by solid lines ending in arrows, and monetary flows are shown by dashed lines ending in arrows. FIG. 1 shows only a representative subset of the information and monetary flows used in the administration of the combined program. For instance, the first insurance premium payment by the homebuyer to the life insurance company is not shown in FIG. 1.

Other entities participating directly or indirectly in the combined program, but not shown in FIG. 1, are investors (i.e., purchasers of mortgage loans) and service providers, who act as agents for lenders and investors (such as for automatically making monthly mortgage payments and monthly mortgage insurance payments from a homeowner's bank account).

Figure 2:
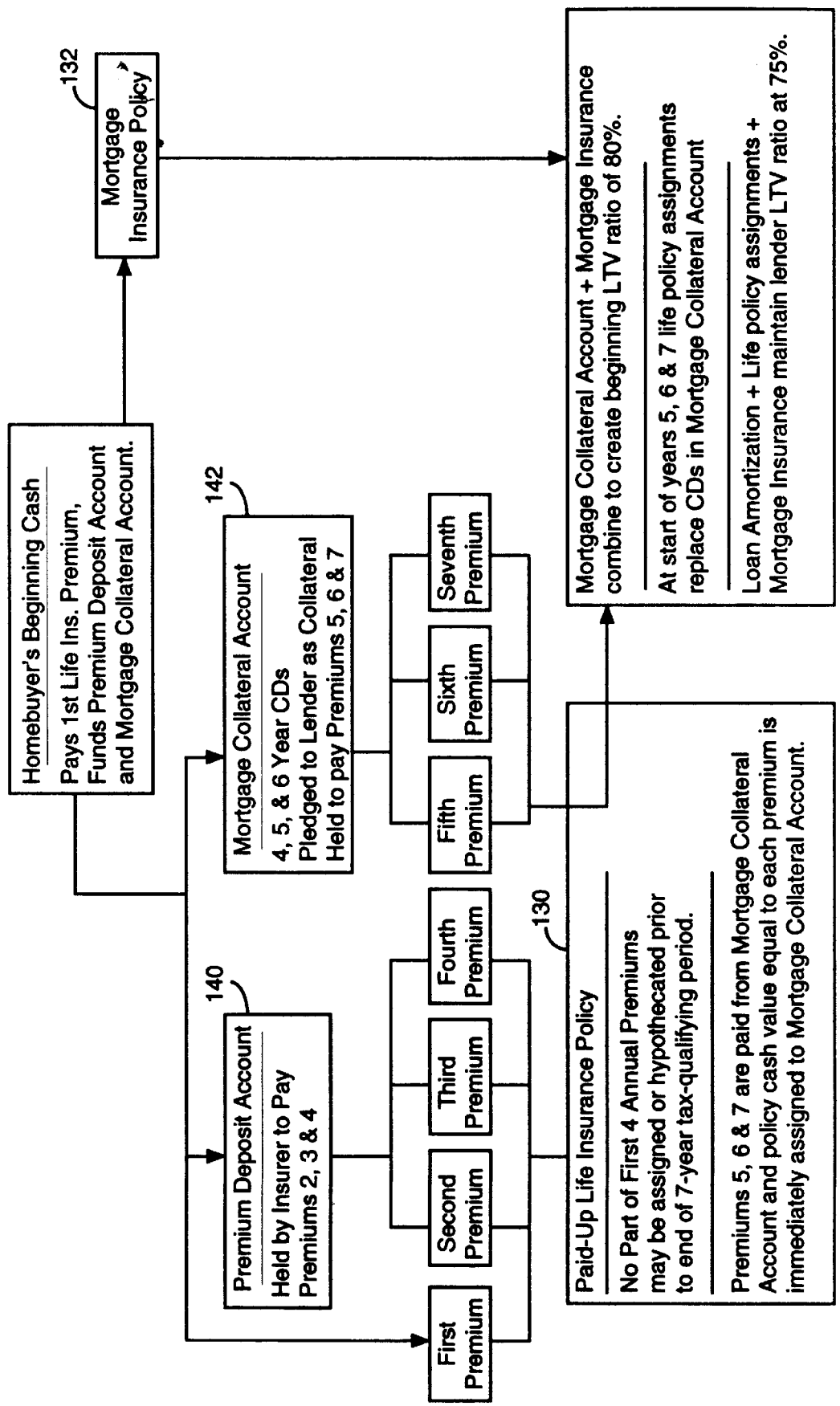
FIG. 2 is a block diagram showing the allocation of a homebuyer's beginning cash when participating in the combined mortgage and life insurance purchase program.

To help explain the roles of some of these entities reference is made to FIG. 2, which shows the allocation of a homebuyer's beginning cash when participating in the combined mortgage and life insurance program of the preferred embodiment. FIG. 2 further illustrates the timing of subsequent cash flows from custodial accounts and how the mortgage lender is secured by the non-traditional collateral associated with the combined mortgage and life insurance program administered by the present invention.

When a homebuyer participates in the combined mortgage and life insurance purchase program associated with the preferred embodiment of the present invention, the homebuyer's "beginning cash" that would normally be used as a "down payment" is, instead, used to fund seven annual premium payments of a 7-pay tax qualified life insurance policy 130. The beginning cash may also be used to prepay all or a portion of a mortgage insurance policy 132. The first of the seven annual life insurance premium payments is paid directly by the homebuyer from his/her "beginning cash" prior to the closing of the mortgage loan. In the preferred implementation, the life insurance policy is issued and the first life insurance premium is paid at least five business days prior to the date of the mortgage loan. In other embodiments, the deadline for payment of the first life insurance premium may be placed closer to the mortgage loan closing, so long as the first life insurance premium is paid prior to the closing of the mortgage loan so as to help establish the independence of the life insurance policy from the mortgage loan.

Prior to or at the time the mortgage loan is closed, a portion of the beginning cash is deposited in a Premium Deposit Account 140, which is held by the life insurance company to pay the 2nd, 3rd and 4th annual premiums of the 7-pay insurance policy. The funds in the Premium Deposit Account are held by the insurance company, and no part of those funds and no part of the initial life insurance premium can be borrowed or otherwise hypothecated by the homebuyer until the life insurance policy has been in effect for seven full years.

Another portion of the beginning funds is deposited in a Mortgage Collateral Account 142, funding three Certificates of Deposit (CDs). The three CDs are funded so that at maturity, at the beginning of the 5th, 6th and 7th years of the life insurance policy, the value of each CD is exactly equal to the premium due at that date. All the funds in the Mortgage Collateral Account are pledged as security to the lender. As each CD matures, the resulting funds are used to pay an annual life insurance premium. Upon receipt of each such annual premium, the life insurance company assigns an equal amount of value in the life insurance policy to the Mortgage Collateral Account 142. In an alternate embodiment, the security interest assignments made by the life insurance company after receiving each of the 5th, 6th and 7th annual premium payments are assigned to the current mortgage noteholder in place of the security assignment to the Mortgage Collateral Account.

When the home associated with the mortgage is sold and the mortgage paid (typically from proceeds of the sale), all pledged amounts are released to the life insurance policy owner. The life insurance policy owner always has the option to cancel the policy, but pledged amounts of the policy's cash value remain pledged to the mortgage lender as long as the loan is outstanding, unless the pledged collateral has been released by the mortgage noteholder.

If the insured person dies while there are still funds in the premium deposit account that are not yet due as premiums, those funds will be returned to the life insurance policy owner (who is not necessarily the insured person). The policy death benefit will also be paid in full.

The mortgage insurance policy is sized so that the portion of the mortgage covered by the mortgage insurance, plus the funds in the Mortgage Collateral Account are equal to at least 20% of the mortgage loan amount, for an effective LTV ratio no greater than 80%. The funds in the Mortgage Collateral Account can be released to the homeowner, and the homeowner's obligation to maintain a mortgage insurance policy can be terminated, when the homeowner accumulates sufficient equity in the home to achieve an LTV ratio of 75% or less and meets other credit criteria. In the preferred embodiment, the funds in the Mortgage Collateral Account cannot be released earlier than the fifth year of the life insurance policy, unless the mortgage loan has been paid in full (typically due to sale of the home).

Computer Subsystems

Figure 3A:
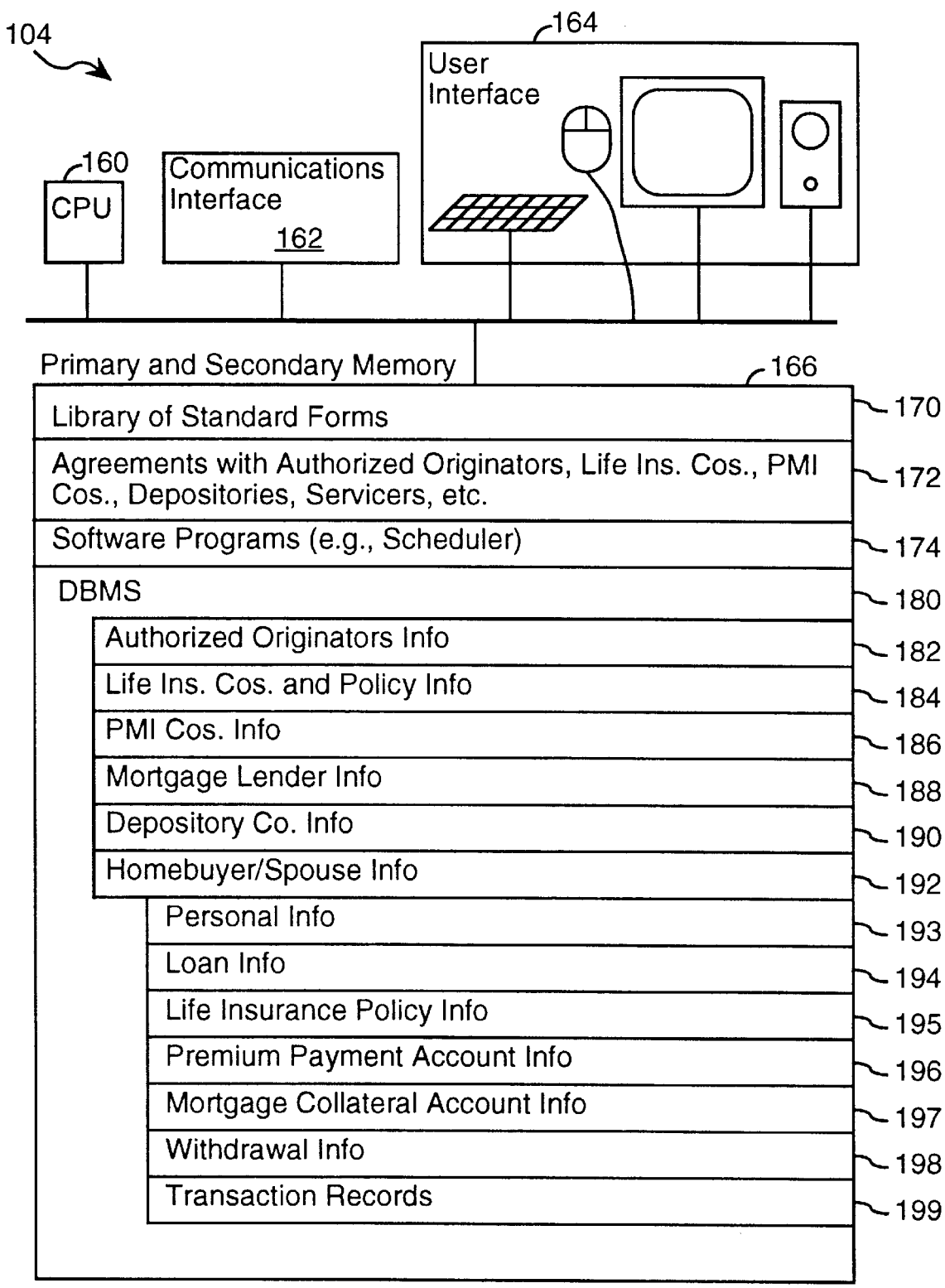
FIGS. 3A–3D are block diagrams of the data processing subsystems associated with the program coordinator, life insurance company, depository company, and other program participants in a preferred embodiment of the present invention.

Referring to FIGS. 1 and 3A, the data processing system 104 of the program coordinator 102 includes a central processing unit 160, a communications interface 162 for transferring information to and from other data processing systems, one or more user interfaces 164 (which may be located at a number of workstations not shown in the Figures), and memory 166 for storing programs and data. The memory 166 is used to store a library of "standard forms" 170 associated with the combined mortgage and insurance program, agreements 172 with authorized mortgage originators, life insurance companies, mortgage insurance companies, depository companies, loan servicers, and so on. The memory 166 furthermore stores various software programs, including a scheduler program 174 for generating dockets of action items, such as checking on the status of mortgage applications that have neither been closed nor withdrawn, checking on the status of scheduled premium payments from Mortgage Collateral Accounts for which confirmations have not been received, scheduling appointments between prospective program participants and licensed insurance agents, and the like.

In addition, memory 166 stores a database management system (DBMS) 180 that stores information about all the entities participating in the combined mortgage and insurance program as well as information about homebuyers participating in the program and prospective homebuyers who have applied to participate. The DBMS includes tables for storing information about:

all participating (i.e.. authorized) mortgage originators 182;

all participating life insurance companies and the life insurance policies that are available under the program 184;

all participating mortgage insurance companies and the insurance policies that are used under the program 186;

participating mortgage lenders who are not participating mortgage originators (i.e., companies to whom mortgages have been sold) 188;

participating depository companies 190 which hold Mortgage Collateral Accounts on behalf of participating lenders and homebuyers; and participating and prospective homebuyers and their spouses 192.

The tables of information 192 about homebuyers and their spouses include:

information about the homebuyer and spouse themselves 193;

information concerning the originator and loan product 194 the homebuyer has selected, the loan's Identifying number, the amount borrowed, the amount of beginning cash the homebuyer is investing in the program, and so on;

information concerning the life insurance policy 195 that the homebuyer has selected, including the selected life insurance company, the type of policy selected, the policy's identifying number, size of the policy, the size of the annual payments, any special conditions or restrictions included in the policy, and the date the policy was purchased;

information concerning the Premium Deposit Account 196, including the account's Identifying number, the date the account was funded, premium payment amounts and due dates, and so on;

information concerning the Mortgage Collateral Account 197, including the identity of the depository company, the account's identifying number, the date the account was funded, premium payment amounts and due dates, collateral exchanges with life insurance companies, and so on;

information concerning withdrawal from the program 198, if the homebuyer has withdrawn; and transaction records 199, representing all significant events that have occurred during the initial processing of the homebuyer's application as well as events associated with the dosing of the life insurance and mortgage agreements and subsequent events associated with money transfers to the life insurance company, and collateral assignment transfers. Transaction records can also record events such as completion of payments on the mortgage, sale of the home by the homeowners, and roll over of the homeowner's assets into a new home purchase under the combined mortgage and insurance program.

Other tables and information may be stored in the DBMS 180, depending on how the combined mortgage and life insurance program is administered, the information available from the other entities participating in the program, the information needed by the other entities participating in the program, the information needed to evaluate the performance of the combined mortgage and insurance program and the information needed to handle various transactions and to provide customer support.

Figure 3B:
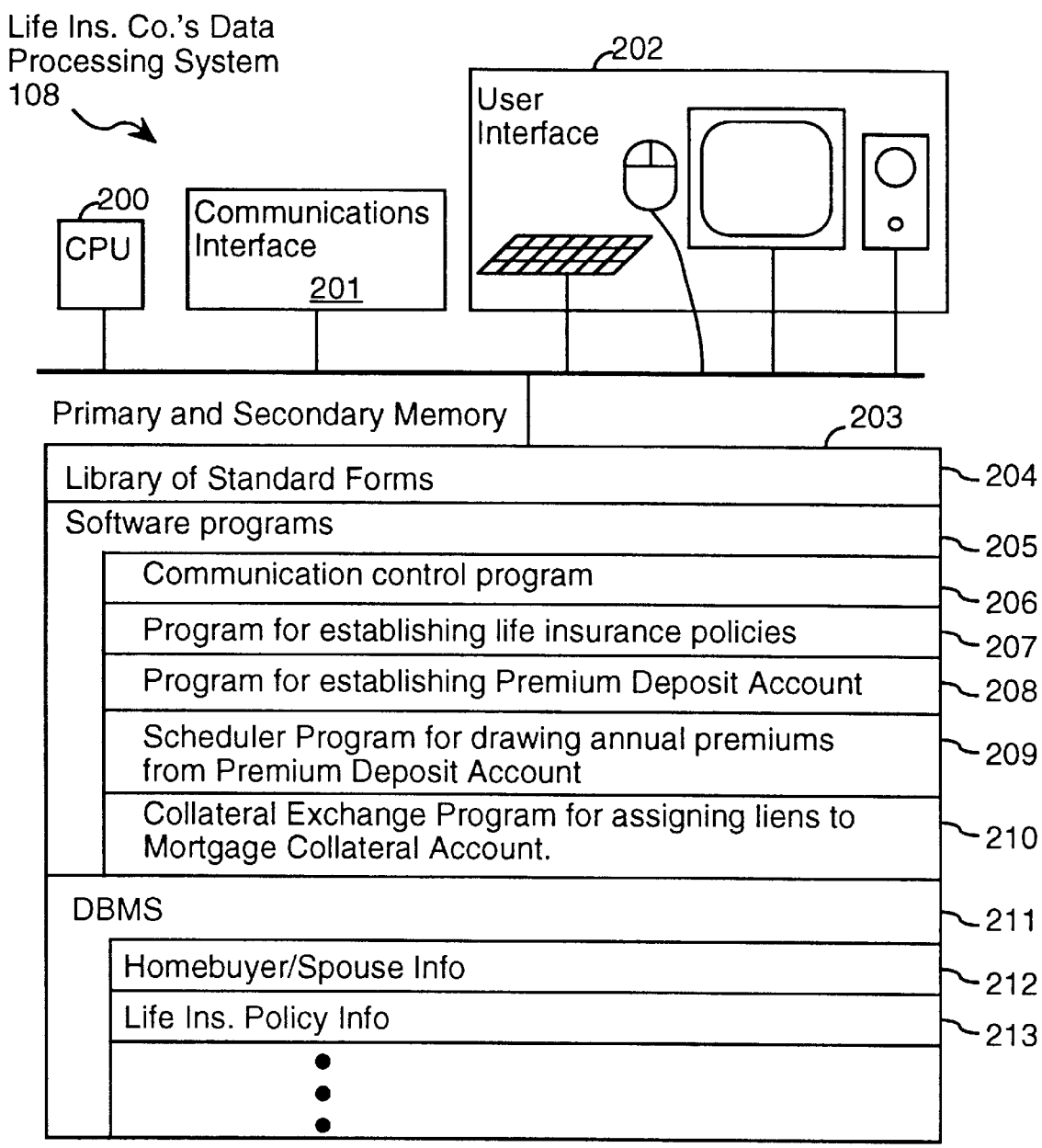

Referring to FIGS. 1 and 3B, the data processing system 108 of each participating life insurance company 106 includes a central processing unit 200, a communications interface 201 for transferring information to and from other data processing systems, one or more user interfaces 202 (which may be located at a number of workstations not shown in the Figures), and memory 203 for storing programs and data. The memory 203 is used to store a library of "standard forms" 204 associated with the processing of life insurance policy applications and the issuance of life insurance policies. The memory 203 furthermore stores various software programs 205, including a communication control program 206 for handling communications with other program participants, a program 207 for establishing life insurance policies, a program 208 for establishing Premium Deposit Accounts, scheduler program 209 for scheduling the drawing of annual premium payments from Premium Deposit Accounts and scheduling other action items, and a collateral exchange program 210 for handling the assignment of liens on life insurance policies to depositories after the receipt of premium payments from those depositories.

In addition, memory 203 stores a database management system (DBMS) 211 that stores information 212 concerning homebuyers participating in the program, information 213 concerning the life insurance policies they have purchased or applied for, as well as other information needed to effectively administer the combined mortgage and insurance program.

Figure 3C:
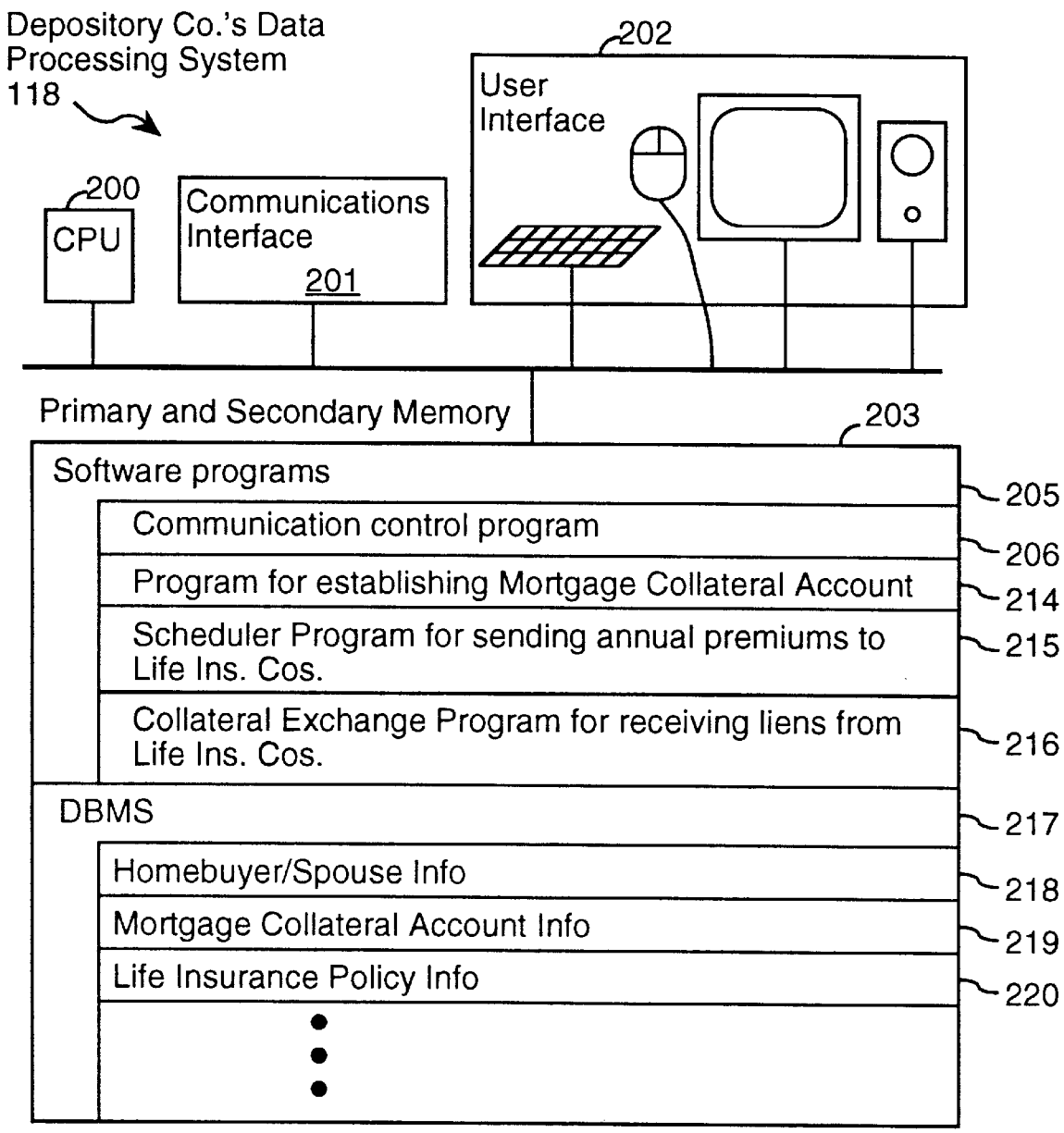

Referring to FIGS. 1 and 3C, the data processing system 118 of each participating depository company 116 includes a central processing unit 200, a communications interface 201 for transferring information to and from other data processing systems, one or more user interfaces 202 (which may be located at a number of workstations not shown in the Figures), and memory 203 for storing programs and data. The memory 203 is used to store various software programs 205, including a communication control program 206 for handling communications with other program participants, a program 207 for establishing life insurance policies, a program 214 for establishing Mortgage Collateral Accounts, a scheduler program 215 for scheduling the payment of annual life insurance premiums from Mortgage Collateral Accounts and scheduling other action items, and a collateral exchange program 216 for handling the receipt of liens on life insurance policies after the payment of corresponding life insurance premiums.

In addition, memory 203 stores a database management system (DBMS) 217 that stores information 218 concerning homebuyers participating in the program and who have Mortgage Collateral Accounts at the associated depository company, information 219 concerning the Mortgage Collateral Accounts established on their behalf, information 220 on the life insurance policies they have purchased or applied for, as well as other information needed to effectively administer the combined mortgage and insurance program.

Figure 3D:
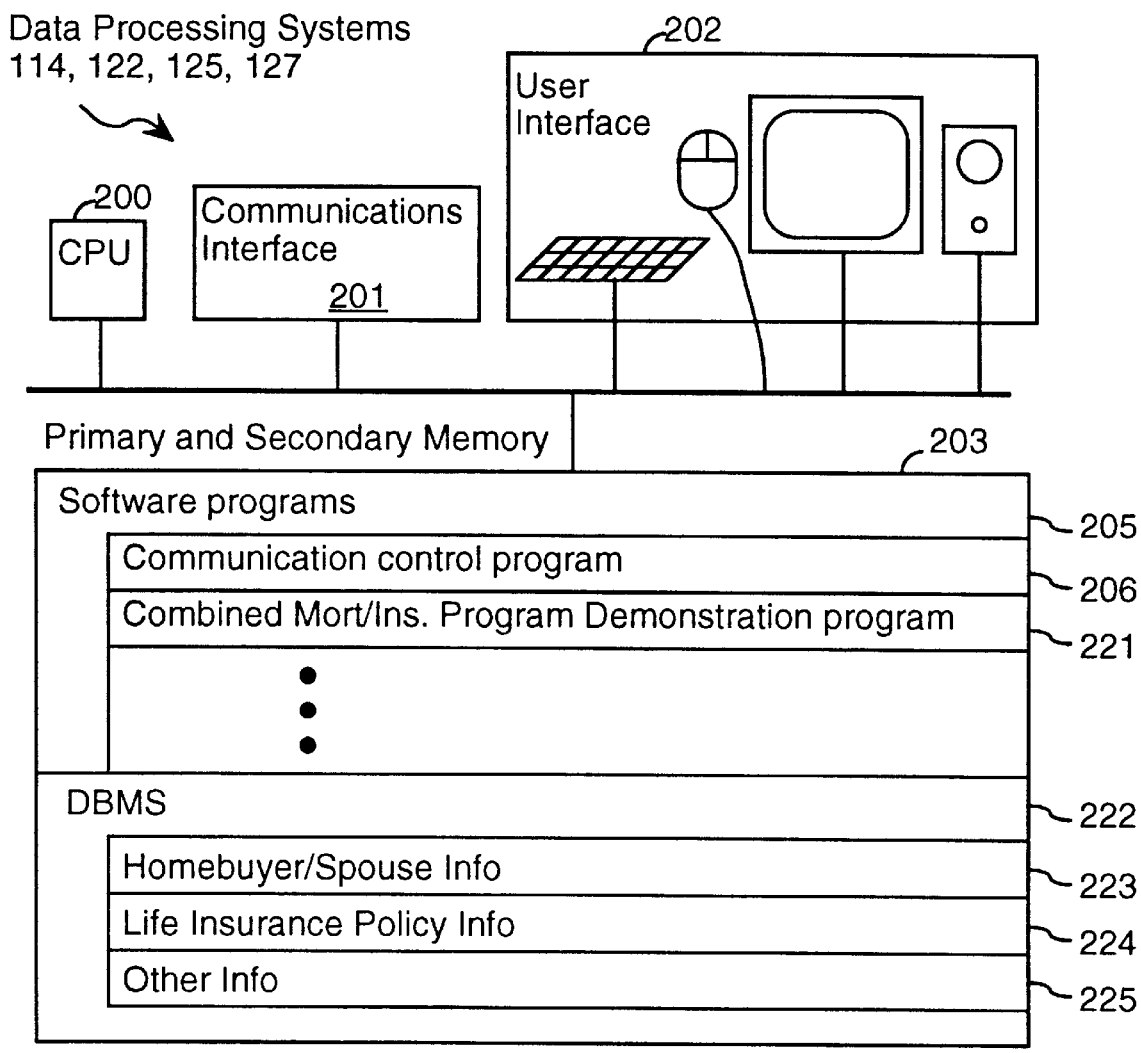

Referring to FIGS. 1 and 3D, the data processing systems 114, 122, 125 and 127 of each participating mortgage originator 112, mortgage insurance company 120, escrow agent 124, and life insurance agent 126, includes a central processing unit 200, a communications interface 201 for transferring information to and from other data processing systems, one or more user interfaces 202 (which may be located at a number of workstations not shown in the Figures), and memory 203 for storing programs and data. The memory 203 is used to store various software programs 205, including a communication control program 206 for handling communications with other program participants, and in the case of the data processing systems 114 and 127 for the mortgage originator 112 and life insurance agent 126, a demonstration program 221 that demonstrates financial analyses and projects associated with standard mortgages and the combined mortgage and life insurance program administered by the system of the present invention.

In addition, memory 203 for each such computer system stores a database management system (DBMS) 222 that stores information 223 concerning those homebuyers using the services of the entity associated with the computer system 114, 122 or 126, information 224 on the life insurance policies they have purchased or applied for, as well as other information 225 needed to effectively administer the combined mortgage and insurance program.

Procedures for Administering the Combined Program

FIGS. 4A–4F illustrate the computer assisted procedures for processing applications to participate in the combined mortgage and life insurance program and for establishing the policies and accounts associated with the program once a homebuyer applicant has qualified to participate and has elected to participate in the program.

The mortgage originator is responsible for making an initial determination as to whether or not a particular mortgage applicant is (A) financially eligible, and (B) interested in participating in the combined mortgage/insurance program (step 230). For this purpose, the program coordinator provides each participating mortgage originator and each participating insurance agent with demonstration software 221 (see FIG. 3D) for comparing the financial investments and returns associated with various traditional mortgages and various versions of the combined program (e.g., using various life insurance products combined with a 100% mortgage). For instance, the demonstration program computes, based on the mortgage applicant's available beginning cash and the cost of the home that the applicant wishes to purchase, the payment schedules associated with various conventional mortgages and the combined program, and also computes the projected value of the home and the combined value of the home and life insurance policy during the life of the mortgage loan, based on various assumptions about tax rates, inflation or deflation, and rates of return on investments associated with the life insurance policy. The demonstration program also calculates the discounted amounts required to fund the premium deposit account and the mortgage collateral account, calculates the amount of life insurance premium, and calculates the monthly mortgage insurance premium. The applicant is allowed and able to choose virtually any set of assumptions he/she wishes to make that would affect mortgage payments and/or the value of the home and life insurance.

It is noted that in many instances, the licensed insurance agent may also be an employee of the mortgage originator. In such instances, the coordination of activities associated with the combined program by the mortgage originator and the licensed life insurance agent are obviously simplified since a single person acts in a dual capacity.

The participating mortgage originator must also determine whether a mortgage applicant is financially eligible to participate in the combined mortgage and life insurance program. The program coordinator provides guidelines to the participating mortgage originators for this purpose. Basically, though, at a minimum the mortgage applicant must have beginning cash equal to at least 20% of the home purchase price plus all other closing costs, and must also have sufficient income to pay the monthly costs associated with the program, which will exceed the monthly costs of a standard 30-year fixed-rate mortgage.

If the mortgage applicant is either not interested in purchasing the combined mortgage and life insurance program or is deemed by the participating mortgage originator not to be financially eligible, the originator handles the applicant as a standard home mortgage applicant (step 231) not participating in the combined program.

If the mortgage applicant is both interested in purchasing the combined mortgage and life insurance program and is deemed by the participating mortgage originator to be financially eligible, the originator sends a notification (step 232) to the data processing system 104 of the program coordinator 102 with a set of basic information about the mortgage applicant, including personal information on the applicant and spouse (if any), the purchase price of the home, the amount of beginning cash to be used to purchase a 7-pay life insurance policy, and so on. In the preferred embodiment, the amount of beginning cash to be used to purchase the life insurance policy must be at least 20% of the home purchase price, although in alternate embodiments other threshold values could be used.

The program coordinator's data processing system 104 stores the information sent by the participating mortgage originator, selects a licensed insurance agent to meet with the mortgage applicant (sometimes herein called the potential homebuyer), and sends a notification to the selected insurance company agent with information about the mortgage applicant and asking the agent to timely meet with the mortgage applicant (step 233). This information is preferably sent electronically to the insurance agent so that most of the information needed to complete the life insurance policy application forms can be electronically transferred onto those forms, reducing the amount of paperwork involved in the life insurance application process.

The insurance agent then meets with the potential homebuyer and attempts to sell him/her any of the life insurance policies that are part of the combined mortgage and life insurance program (step 234). The size of the life insurance policy (i.e., the initial death benefit) is determined by the amount of funds to be used for premium payments, which in turn is determined by the demonstration program 221 from the information received from the program coordinator. The insurance agent is contractually prohibited (by prior agreement with the program coordinator) from trying to sell any other insurance or financial product to the potential homebuyer. The meeting with the life insurance agent gives the potential homebuyer an opportunity to explore the financial aspects and Implications of the life insurance product separately from the mortgage product and to make a decision as to whether or not the life insurance policy is consistent with the potential homebuyer's financial needs and plans.

If the potential homebuyer declines to purchase the life insurance product (step 235), the insurance agent sends a no-sale notice to the program coordinator (step 236). The program coordinator informs the mortgage originator of the non-sale, and updates its database 180 to indicate non-sale of life insurance (step 237). The mortgage originator from that point forward handles the applicant as a standard home mortgage applicant (step 231) not participating in the combined program.

If the potential homebuyer decides to purchase the life insurance product (step 235), the insurance agent initiates (step 238) the performance of medical eligibility tests (e.g., drawing of bodily fluids, etc., by a licensed paramedic service) to determine whether the potential homebuyer qualifies for any life insurance policy included in the coordinator's program (step 252). A second meeting between the insurance agent and the potential homebuyer may be required, for instance if the homebuyer's medical tests or history indicate that the potential homebuyer only qualifies for a substandard life insurance policy to determine whether the potential homebuyer will purchase such a policy.

When the potential homebuyer decided to purchase the life insurance product (step 235) the insurance agent also sends sale notices to the mortgage originator, the program coordinator and, in some cases, to the life insurance company (step 250), but in most cases the program coordinator will relay the sale notice to the life insurance company. The program coordinator updates its database 180 to indicate sale of the life insurance product, and sends information to the insurance company concerning the homebuyer and the life insurance policy being purchased (step 251). In some embodiments, the insurance agent will be the one who sends the life insurance policy information to the life insurance company.

It is noted here that the medical tests and the second meeting between the insurance agent and the potential homebuyer must be performed quickly, because these tasks must be completed at least a week prior to the close of escrow on the purchase of the home being purchased, and the escrow period is just a few weeks in duration in many cases.

After the medical test results are received (step 252), if the homebuyer does not qualify for any life insurance policy included in the coordinator's program or the policies for which the homebuyer qualifies are not acceptable to the potential homebuyer (step 254), the insurance company sends non-qualification notices to the insurance agent, the program coordinator and the homebuyer (step 256). The program coordinator updates its database 180 to indicate non-sale of life insurance (step 258) and sends a non-sale notice to the mortgage originator. The mortgage originator from that point forward handles the applicant as a standard home mortgage applicant (step 260) not participating in the combined program.

If the homebuyer qualifies for any life insurance policy included in the coordinator's program and that is acceptable to the potential homebuyer (step 254), the insurance company sends a "homebuyer qualifies" notice to the program coordinator and to the insurance agent (step 262). At this point the program coordinator updates its database to indicate the homebuyer qualified to purchase the life insurance policy, and the program coordinator assembles and sends a "pre-closing" packet of materials to the insurance agent (step 264).

The pre-closing package includes a "final illustrations" of the combined mortgage and life insurance program based on (A) the actual mortgage and life insurance products that the homebuyer has selected and qualified for as well as (B) the size of the mortgage loan and amount of beginning funds being invested by the homebuyer. The pre-closing package also includes the documents for handling the first life insurance premium payment.

After receiving the pre-closing packet from the program coordinator, the insurance agent meets with the homebuyer, preferably at least one week (preferably at least five business days) prior to the planned closing of the mortgage to review this final illustration to give the homebuyer one last chance to back out of the coordinators program (step 266). The mortgage originator, up to this point, remains prepared to proceed with either a standard mortgage or with the combined mortgage and life insurance product of the program coordinator.

If the homebuyer elects at this point not to continue with the program coordinator's combined mortgage and life insurance program after reviewing the final illustration (step 280), the insurance agent sends a "withdrawal" or "back-out" notice to the program coordinator (step 282). The program coordinator updates its database 180 to indicate the homebuyer's decision and sends a corresponding notice to the life insurance company and the mortgage originator (284). Thereafter the mortgage originator handles the homebuyer as a standard home mortgage applicant not participating in the combined program (286).

If the homebuyer elects to continue with the program coordinator's combined mortgage and life insurance program after reviewing the final illustration (step 280), the insurance agent collects the first insurance premium from the homebuyer, sends a "1st premium collected" notice to the program coordinator, and sends the first premium payment to the life insurance company via the program coordinator (step 287). In other words, the first premium payment check from the homebuyer is sent to the Coordinator, who in turn routes it to the life insurance company. In this way the Coordinator knows that the first premium payment has, in fact, been delivered to the life insurance company.

Upon receiving the "1st premium collected notice, the program coordinator updates its database to record this event, and then assembles and sends closing packets to the mortgage originator, escrow agent and life insurance agent (step 288) in preparation for the mortgage closing. The closing packets include all the documents that will be needed at the home purchase closing for compliance with the terms and conditions of the combined mortgage and life insurance program.

The mortgage originator proceeds as planned at the mortgage closing, using the documents in the closing packet provided by the program coordinator (step 288). The escrow agent or mortgage originator (depending on the jurisdiction) receives the "beginning funds" (other than the previously paid first life insurance premium) from the homebuyer and the mortgage loan funds from the mortgage lender (step 290) and distributes a portion of those funds (step 292) to the former owner of the purchased home and/or the former owner's lender. A portion of the funds will be distributed to the mortgage insurance company, either for payment of the first premium or for full or partial prepayment of the entire policy. Other portions of the received funds are deposited in the Premium Deposit Account (held by the life insurance company for payment of premiums 2, 3 and 4), and the Mortgage Collateral Account (in the form of three certificates of deposit with maturity dates on the 4th, 5th and 6th anniversaries of the life insurance policy's effective date). The escrow agent also sends to the program coordinator information confirming the distributions, amounts and recipients, and/or copies of the executed closing documents, along with checks and executed collateral pledges that the program coordinator is responsible for delivering.

In the preferred embodiment, the funds to be deposited in the Premium Deposit Account are delivered via a check that is first sent to the program coordinator and then delivered by the program coordinator to the life insurance company. The funds for the Mortgage Collateral Account are either deposited directly by the escrow agent into an account at the depository company, or are delivered by the escrow agent to the life insurance company with instructions to deposit the funds in an account at the depository company. Pledges of the funds in the Mortgage Collateral Account are delivered to the mortgage originator by the program coordinator.

The program coordinator updates its database to indicate the closing, funds transfers, funds recipients and delivery of collateral pledges. It also assembles and sends an information packet to the homebuyer providing answers to common questions, and indicating how the homebuyer should contact the program coordinator and the services available from the program coordinator (step 294).

It is noted here that by law, which varies from jurisdiction to jurisdiction, every life insurance buyer has a "free look" period during which he/she can cancel the policy and receive a full refund of all payments and deposits. The free look period typically has a duration of 10 to 20 days. Thus, the homebuyer could cancel his/her life insurance policy after the closing on the home mortgage. However, the funds in the Mortgage Collateral Account would still be pledged as collateral to the mortgage lender, and thus those funds would be retained in the Mortgage Collateral Account even though the life insurance policy was canceled.

Figure 4A:
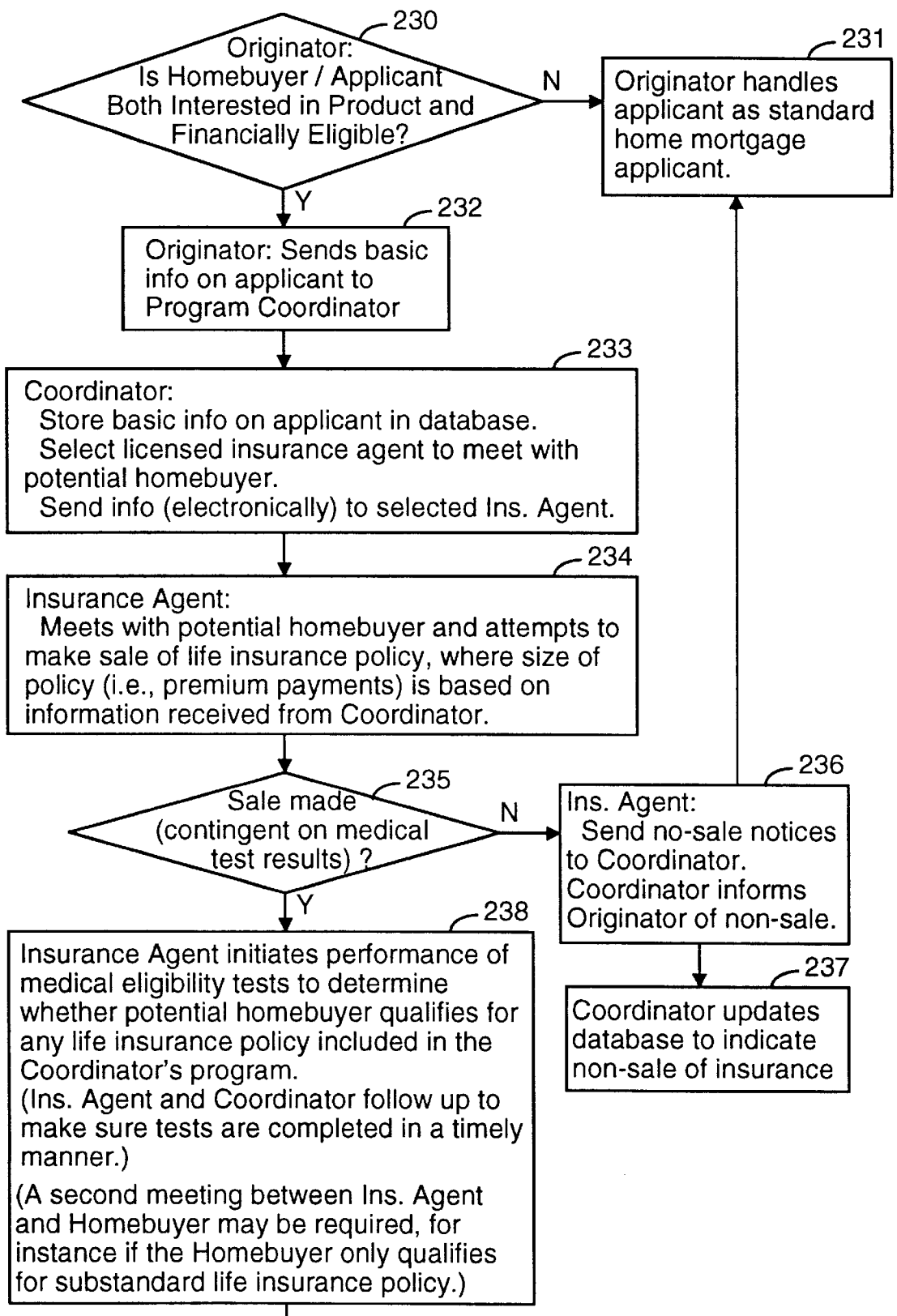
FIGS. 4A–4F contain a flow chart of the data processing and funds flow control procedures used in a preferred embodiment of the present invention.
Figure 4B:
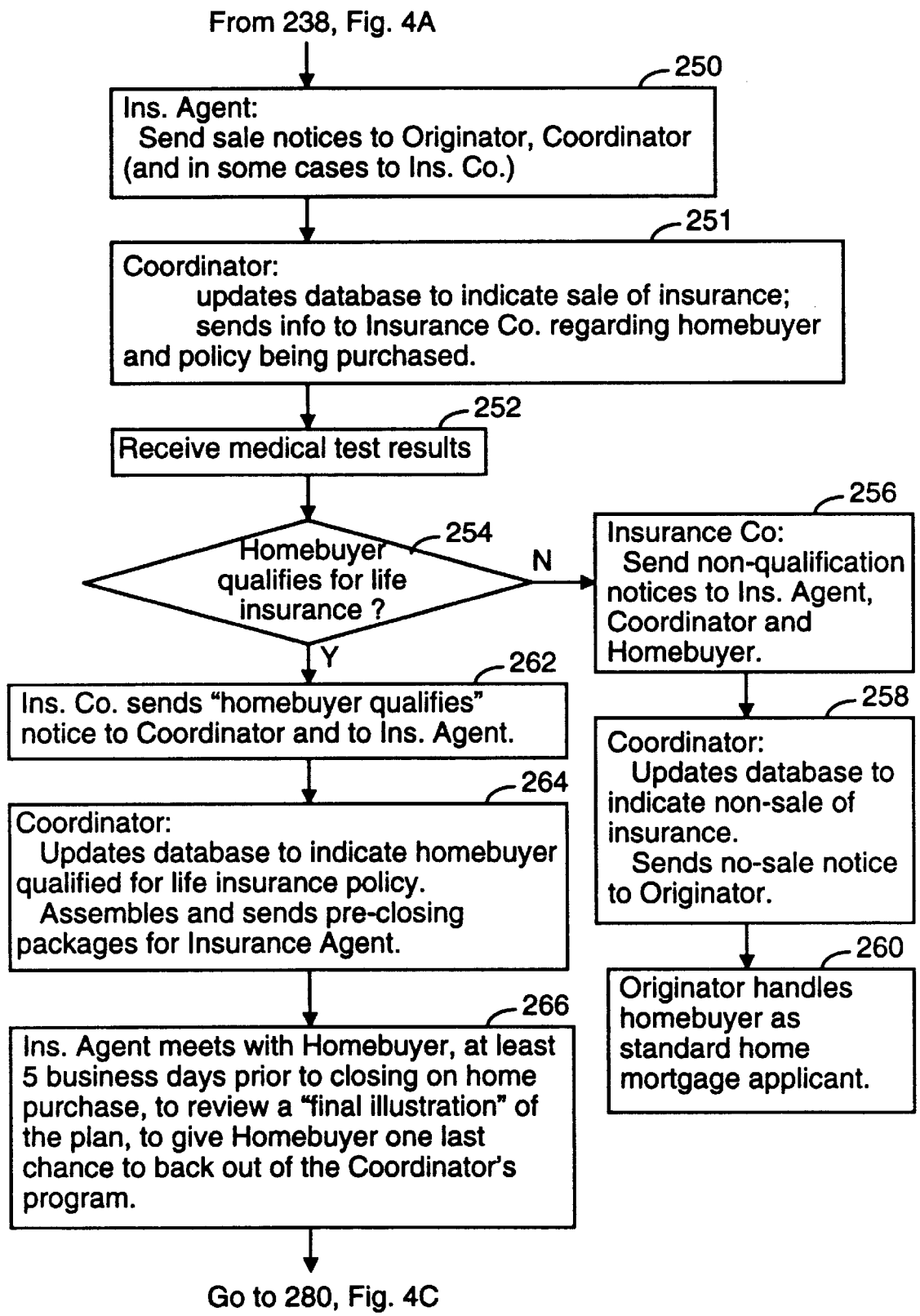
Figure 4C:
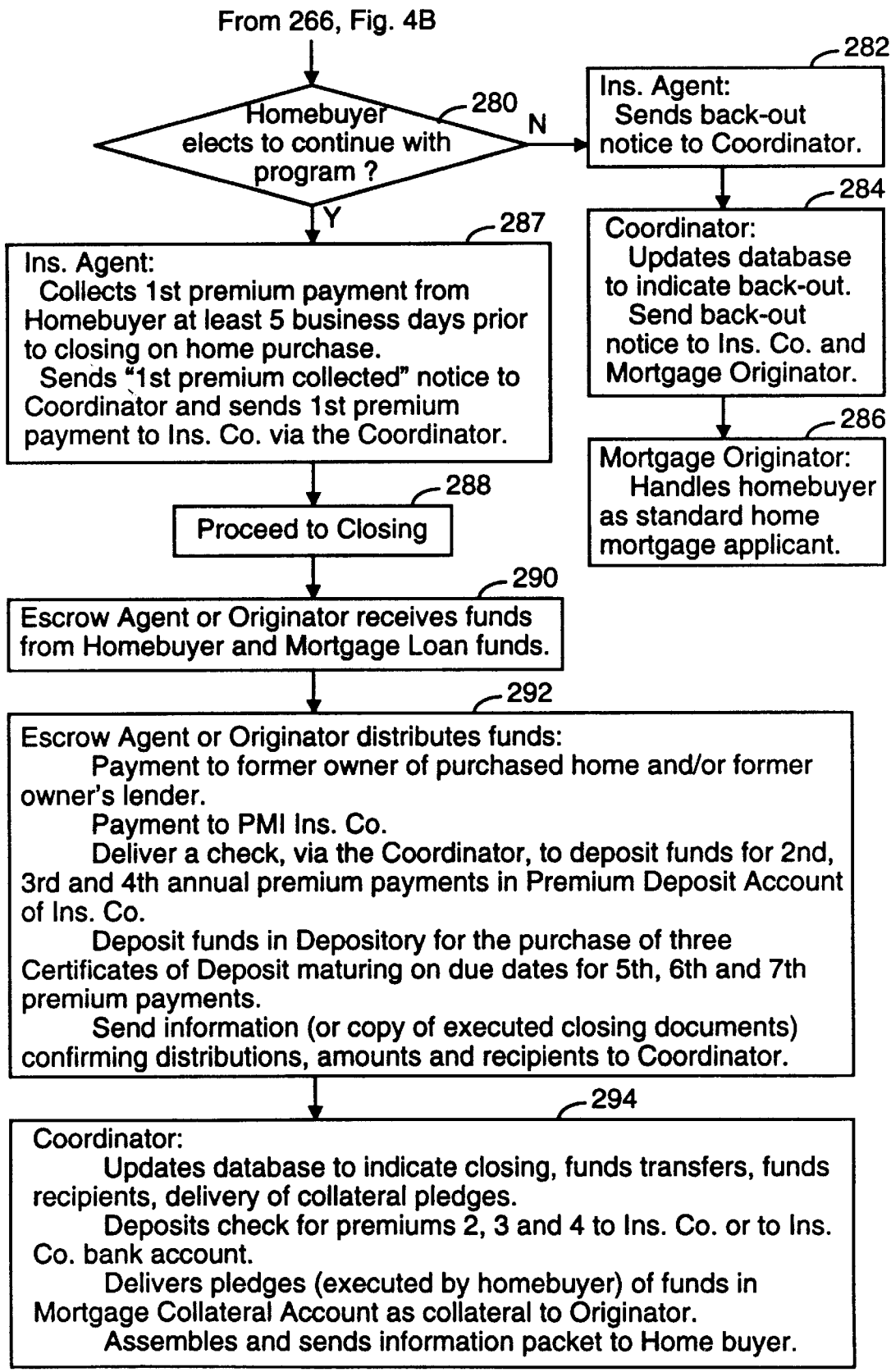
Figure 4D:
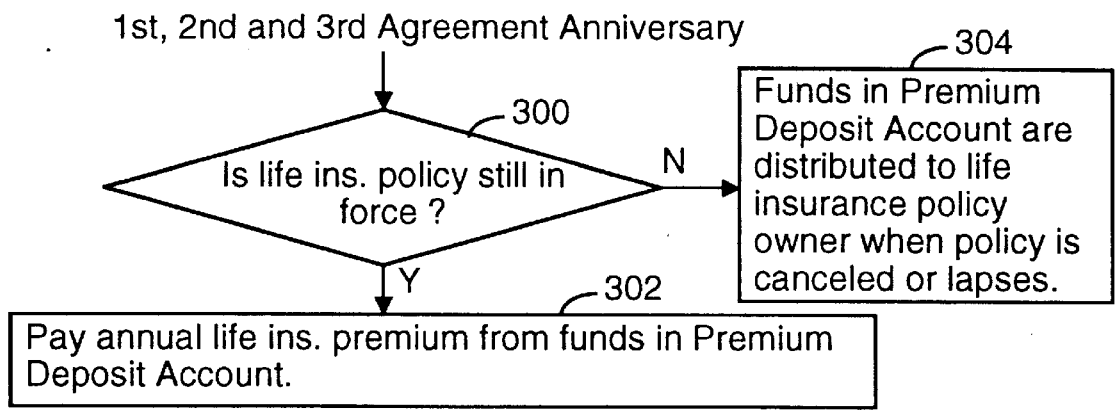
Figure 4E:
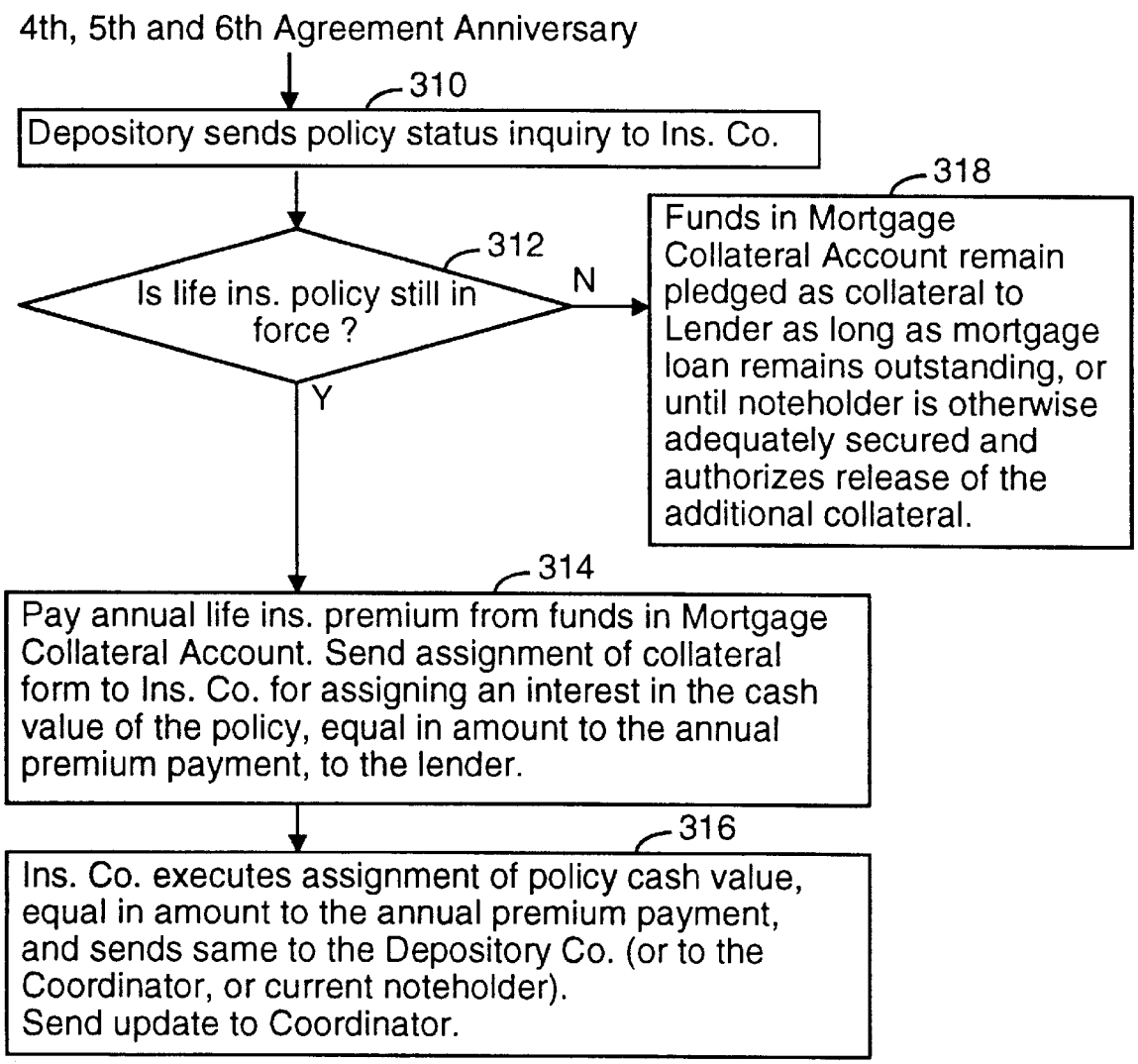
Figure 4F:
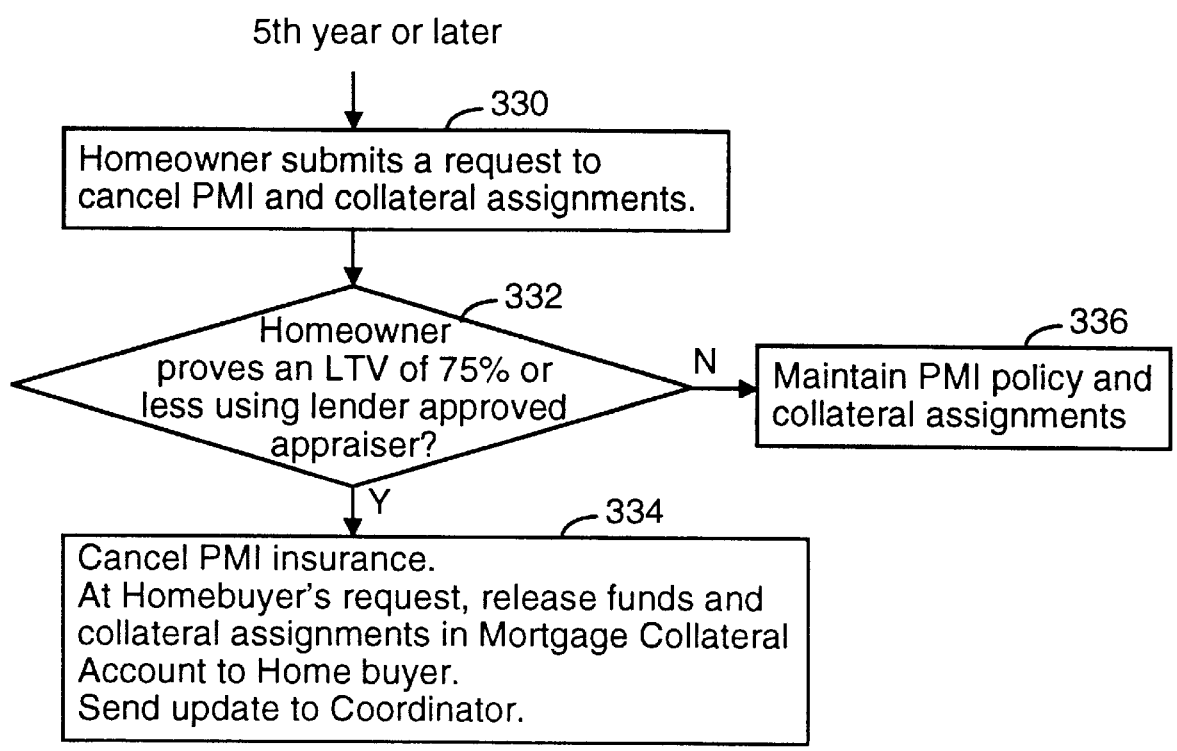

At this point, the initial transaction is completed. Referring to FIGS. 4D–4F, the remaining tasks to be performed by the program coordinator and the other entities are to schedule and track payments of the 2nd through 7th life insurance annual premiums and the delivery of collateral pledges from the life insurance company to the Mortgage Collateral Account (or to the lender) when it receives each of the 5th, 6th and 7th premiums. More specifically, referring to FIG. 4D, at the 1st, 2nd and 3rd anniversaries of the life insurance policy, if the life insurance policy is still in force (step 300), the corresponding annual life insurance premium is paid from funds in the Premium Deposit Account (step 302). If the life insurance policy is cancelled, or lapses, or has been paid due to death of the insured prior to the premium due date, the remaining funds in the Premium Deposit Account are paid to the life insurance policy owner (who is usually, but not always, the homeowner) (step 304).

Referring to FIG. 4E, just prior to the 4th, 5th and 6th anniversaries of the life insurance policy, the depository sends a notice to the life insurance company prior to making each of the 5th, 6th and 7th premium payments to make sure that the life insurance policy is still in force (step 310). If the insurer confirms to the depository that the policy is still in force (step 312), the Depository makes the premium payment (step 314) and sends an assignment of collateral form to the life insurance company to return to the depository. After the insurer receives the premium payment from the depository, the insurer executes the assignment of collateral form and returns it to the depository, thereby assigning to the current mortgage noteholder (via the Mortgage Collateral Account) a security interest in the cash value of the life insurance policy to which the premium payment was applied (step 316). The depository company and/or the life insurance company send update notices to the program coordinator when a premium payment is made from the Mortgage Collateral Account and a corresponding assignment of collateral is made by the life insurance company, and the program coordinator updates its database with the information from those notices (step 316). The value of each security interest assignment matches the premium payment received from the depository. In alternate embodiments of the invention, the assignment of collateral from the life insurance company may be held by the program coordinator, or by the current mortgage noteholder.

If the life insurance policy is not in force, the depository does not send a premium payment to the life insurance company, but continues to hold the funds in the Mortgage Collateral Account as collateral pledged to the lender (step 318).

Referring to FIG. 4F, anytime after the fourth anniversary of the life insurance policy, the homeowner may submit a request to either the program coordinator or to the current mortgage noteholder to cancel the PMI policy and to release the collateral and collateral assignments held in the Mortgage Collateral Account (step 330). The homeowner is referred to an appraiser approved by the current mortgage noteholder, who then appraises the value of the homeowner's home at the homeowner's expense. If the appraisal of the home demonstrates that the balance of the mortgage is 75% or less of the home's appraised value (step 332), the program coordinator (or the current mortgage noteholder) sends a release authorization to the homeowner, which the homeowner can then use to cancel the mortgage insurance policy, and also sends a release authorization to the depository company, when then cancels the liens it is holding on the Mortgage Collateral Account's assets (step 334). Once the lien on the Mortgage Collateral Account's assets has been canceled, if the life insurance policy is less than six years old, there will still be monetary funds in the Mortgage Collateral Account that the homeowner can access. If the life insurance policy is at least six years old, there will be no monetary funds in the Mortgage Collateral Account. However, the cancellation of the liens on the life insurance policy's cash value will make money available to the homeowner from the life insurance policy.

Alternate Embodiments

In some embodiments of the present invention, some of the entities (such as some of the escrow agents) will either not use a computer system to help administer their role in the combined program, or will have computer systems that cannot communicate directly with the program coordinator. Even in such embodiments, the computer subsystem of the program coordinator and of the other entities that do use computers to communicate with the program coordinator will maintain databases of all information needed to administer the combined program and to schedule all essential events.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A data processing system for administering a combined mortgage loan and life insurance program to finance a real estate purchase and to purchase a life insurance product, said system comprising:

a program coordinator's computer subsystem;

mortgage originators' computer subsystems;

at least one life insurance company's computer subsystem;

at least one depository company's computer subsystem;

said program coordinator's computer subsystem including:

communications means for sending communications to and receiving communications from said mortgage originators' computer subsystems, said at least one life insurance company's computer subsystem, and said at least one depository company's computer subsystem;

a database for storing information about program participants, mortgage originators participating in said combined program, life insurance companies participating in said combined program and the life insurance products of the participating life insurance companies available to the program participants through the combined program, and depository companies participating in said combined program;

each said mortgage originator's computer subsystem including:

means for sending communications to and receiving communications from said program coordinator's computer subsystem about applications by prospective program participants, including communications to the program coordinator's computer subsystem indicating personal information about each said prospective program participant, the amount of beginning funds to be invested by each said prospective program participant, the size of an amortized mortgage loan for which each said prospective program participant has applied;

a database for storing information about participants and prospective participants and associated amortized mortgage loans;

each said life insurance company's computer subsystem including:

means for establishing a life insurance policy and an associated premium deposit account for each program participant who purchased a life insurance product of said life insurance company;

means for sending communications to and receiving communications from said program coordinator's computer subsystem about life insurance applications by prospective program participants, and about establishment of and status of said life insurance policies; and premium payment means for transferring funds at scheduled times from each premium deposit account so as to pay corresponding scheduled premiums due on the associated life insurance policy; and each said depository company's computer subsystem, including:

means for establishing a mortgage collateral account for specified ones of said program participants;

fund transfer means for transferring funds at scheduled times from each mortgage collateral account to a specified one of the life insurance companies so as to pay corresponding scheduled premiums due on an associated life insurance policy; and means for sending communications to and receiving communications from said program coordinator's computer subsystem about establishment of a mortgage collateral account for specified ones of said program participants, and for sending communications to said program coordinator's computer system indicating when funds in said mortgage collateral account have been transferred to one of said life insurance companies to pay life insurance product premiums;

wherein the premium deposit account and mortgage collateral account for each program participant are funded by a single initial payment by the program participant.

2. The system of claim 1, further including:

at least one mortgage insurance company's computer subsystem, including:

means for sending communications to and receiving communications from said program coordinator's computer subsystem about mortgage insurance applications by prospective program participants; and means for establishing a mortgage insurance policy for specified ones of said program participants.

3. The data processing system of claim 1 wherein each life insurance policy has a death benefit payable to a life insurance policy owner, and the funds in each mortgage collateral account are pledged as security to a holder of the associated mortgage loan.

4. A data processing system for administering a combined mortgage loan and life insurance program to finance a real estate purchase and to purchase a life insurance product, said system comprising:

a program coordinator's computer subsystem;

mortgage originators' computer subsystems;

at least one life insurance company's computer subsystem;

at least one depository company's computer subsystem;

said program coordinator's computer subsystem including:

communications means for sending communications to and receiving communications from said mortgage originators' computer subsystems, said at least one life insurance company's computer subsystem, and said at least one depository company's computer subsystem;

a database for storing information about program participants, mortgage originators participating in said combined program, life insurance companies participating in said combined program and the life insurance products of the participating life insurance companies available to the program participants through the combined program, and depository companies participating in said combined program;

said database storing, for each program participant and prospective program participant, (A) personal information, (B) beginning funds information indicating the amount of beginning funds invested or to be invested, (C) mortgage information indicating an amortized mortgage loan size and which one of said participating mortgage originators originated said program participant's amortized mortgage, (D) life insurance information indicating a selected life insurance product purchased by the program participant, a corresponding selected life insurance company providing said purchased life insurance product, and the life insurance premiums to be paid, (E) premium deposit account information concerning a premium deposit account in which a portion of said beginning funds are deposited; (F) mortgage collateral account information concerning a mortgage collateral account in which a portion of said beginning funds are deposited, and the depository company holding said mortgage collateral account;

each said mortgage originator's computer subsystem including:

means for sending communications to and receiving communications from said program coordinator's computer subsystem about applications by prospective program participants, including communications to the program coordinator's computer subsystem indicating personal information about each said prospective program participant, the amount of beginning funds to be invested by each said prospective program participant, the size of an amortized mortgage loan for which each said prospective program participant has applied;

a database for storing information about participants and prospective participants and associated amortized mortgage loans;

each said life insurance company's computer subsystem including:

means for sending communications to and receiving communications from said program coordinator's computer subsystem about life insurance applications by prospective program participants, including communications to the program coordinator's computer subsystem indicating qualification or non-qualification of each said prospective program participant who selected a life insurance of said life insurance company with respect to said life insurance applications, communications to the program coordinator's computer subsystem concerning establishment of a premium deposit account for each program participant who selected a life insurance product of said life insurance company;

means for establishing a life insurance policy and an associated premium deposit account for each program participant who purchased a life insurance product of said life insurance company; and premium payment means for transferring funds at scheduled times from each premium deposit account so as to pay corresponding scheduled premiums due on the associated life insurance policy; and each said depository company's computer subsystem including:

means for sending communications to and receiving communications from said program coordinator's computer subsystem about program participants, including communications from the program coordinator's computer subsystem requesting establishment of a mortgage collateral account for specified ones of said program participants, and for sending communications to the program coordinator's computer subsystem indicating establishment of said mortgage collateral accounts and for sending communications to said program coordinator's computer system indicating when funds in said mortgage collateral account have been transferred to one of said life insurance companies to pay life insurance product premiums;

means for establishing a mortgage collateral account for said specified ones of said program participants; and fund transfer means for transferring funds at scheduled times from each mortgage collateral account to a specified one of the life insurance companies so as to pay corresponding scheduled premiums due on an associated life insurance policy;

wherein the premium deposit account and mortgage collateral account for each program participant are funded by a single initial payment by the program participant.

5. The system of claim 4, further including:

at least one mortgage insurance company's computer subsystem, including:

means for sending communications to and receiving communications from said program coordinator's computer subsystem about mortgage insurance applications by prospective program participants; and means for establishing a mortgage insurance policy for specified ones of said program participants.

6. The data processing system of claim 4 wherein each life insurance policy has a death benefit payable to a life insurance policy owner, and the funds in each mortgage collateral account are pledged as security to a holder of the associated mortgage loan.

7. A method of administering a combined mortgage loan and life insurance program to finance a real estate purchase and to purchase a life insurance product, the method being performed by a distributed set of computers, the method comprising the steps of:

for each participant in the program, establishing an amortized mortgage loan with a mortgage lender, a life insurance policy with a life insurance company, a premium deposit account at the life insurance company, a mortgage collateral account at a depository company, a private mortgage insurance (PMI) policy at an PMI insurance company; wherein each life insurance policy is a fixed N-payment policy, where N is a positive integer;

funding the life insurance policy for each particular program participant entirely with a single, initial payment by the program participant, wherein a first portion of the initial payment is used to fund a first payment of the life insurance policy, a second portion of the initial payment is deposited in the premium deposit account established for the program participant and a remaining third portion of the initial payment is deposited in the mortgage collateral account established for the program participant; wherein the second portion of the initial payment is fixed so as to be sufficient to fund payments 2 through M on the life insurance policy, where M is a positive integer smaller than N, and the third portion of the initial payment is sized so as to be sufficient to fund payments M+1 through N on the life insurance policy;

for each program participant, establishing a lien by the associated mortgage lender on the funds in the program participant's mortgage collateral account;

scheduling periodic payments by the program participant on the amortized mortgage loan and on the PMI policy;

for each program participant: automatically transferring funds at scheduled times from the program participants premium deposit account so as to pay corresponding scheduled premiums 2 through M due on the associated life insurance policy; and for each program participant, automatically transferring funds at scheduled times from the program participant's mortgage collateral account so as to pay corresponding scheduled premiums M+1 to N due on the program participant's associated life insurance policy; and at the program coordinator's computer subsystem, maintaining program status information for each program participant, including receiving notifications of the fund transfers from each program participant's premium deposit account and mortgage collateral account and updating the program participant's status information in accordance therewith.

8. The method of claim 7, further including:

each time funds are transferred from a program participant's mortgage collateral account to fund an associated life insurance policy payment, automatically establishing a lien by the program participants mortgage lender on a corresponding increase in the life insurance policy's value.

9. The method of claim 7 wherein the life insurance policy has a death benefit payable to a life insurance policy owner.

* * * * *